(12) United States Patent
Ruan et al.

(10) Patent No.: US 8,739,024 B2
(45) Date of Patent: May 27, 2014

(54) METHOD AND APPARATUS FOR PROCESSING WORLD WIDE WEB PAGE

(75) Inventors: Shudong Ruan, Guangdong (CN); Yu Xu, Guangdong (CN); Mo Peng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/823,603

(22) PCT Filed: Nov. 21, 2011

(86) PCT No.: PCT/CN2011/082504
§ 371 (c)(1),
(2), (4) Date: Mar. 29, 2013

(87) PCT Pub. No.: WO2012/071993
PCT Pub. Date: Jun. 7, 2012

(65) Prior Publication Data
US 2013/0238980 A1 Sep. 12, 2013

(30) Foreign Application Priority Data
Dec. 3, 2010 (CN) .......................... 2010 1 0586269

(51) Int. Cl.
*G06F 17/00* (2006.01)
(52) U.S. Cl.
USPC ............ 715/234; 715/205; 715/255; 715/760
(58) Field of Classification Search
USPC ......... 715/200, 202, 204, 205, 209, 234, 255, 715/256, 273, 760
See application file for complete search history.

(56) References Cited

U.S. PATENT DOCUMENTS 6,944,817 B1 *   9/2005   Danneels ...................... 715/207
6,955,298 B2 * 10/2005   Herle ....................... 235/472.01

(Continued)

FOREIGN PATENT DOCUMENTS

| CN | 101192234 A | 6/2008 |
| CN | 101276362 A | 10/2008 |
| CN | 101625700 A | 1/2010 |
| WO | WO-2008/157322 A1 | 12/2008 |

OTHER PUBLICATIONS

Written Opinion, International Application No. PCT/CN2011/082504, mailing date Mar. 8, 2012.

(Continued)

*Primary Examiner* — Maikhanh Nguyen
(74) *Attorney, Agent, or Firm* — Marshall, Gerstein & Borun LLP

(57) ABSTRACT

Embodiments of the present invention provide a method for processing a World Wide Web (WWW) page, which includes: determining at least one website to be optimized; generating a corresponding page template for each of WWW pages with different types in each website, and storing the page template; grabbing WWW pages from each website, matching each grabbed WWW page with a page template, filtering redundant HTML data from the WWW page according to a matching result, and storing the filtered WWW page; after receiving a request sent by a terminal for accessing a WWW page, determining whether there is a stored filtered WWW page corresponding to the WWW page requested by the terminal, if yes, returning the filtered WWW page to the terminal. Embodiments of the present invention also provide an apparatus for processing a WWW page. With the scheme of the present invention, redundant information may be efficiently eliminated.

11 Claims, 1 Drawing Sheet

(56) References Cited

U.S. PATENT DOCUMENTS

| | | | |
|---|---|---|---|
| 7,047,318 B1* | 5/2006 | Svedloff | 709/246 |
| 7,529,771 B2* | 5/2009 | Watanabe et al. | 1/1 |
| 7,873,680 B2* | 1/2011 | Meadows | 707/811 |
| 7,945,556 B1* | 5/2011 | Barnes et al. | 707/710 |
| 8,073,865 B2* | 12/2011 | Davis | 707/769 |
| 8,195,638 B1* | 6/2012 | Barnes et al. | 707/709 |
| 2001/0037490 A1* | 11/2001 | Chiang | 717/2 |
| 2002/0133627 A1 | 9/2002 | Maes et al. | |
| 2004/0255233 A1* | 12/2004 | Croney et al. | 715/500 |
| 2005/0108259 A1* | 5/2005 | Watanabe et al. | 707/100 |
| 2008/0250310 A1 | 10/2008 | Chen et al. | |
| 2009/0307266 A1 | 12/2009 | Fleizach et al. | |
| 2010/0199197 A1* | 8/2010 | Faletski et al. | 715/760 |
| 2011/0066662 A1* | 3/2011 | Davis | 707/811 |

OTHER PUBLICATIONS

International Search Report for PCT/CN2011082504 dated Mar. 8, 2012.

"Research on Automatic Web Information Extraction Technique," (2008). Abstract only.

Yan, "A RSS Level Web Page Main Content Extraction Method and System," Library and Information Service, 54(14):107-110, 130 (2010). Abstract only.

Extended European Search Report for Application No. 11844631.9, dated Jul. 12, 2013.

Chinese Office Action from corresponding Application No. 201010586269.4 dated Aug. 28, 2013.

Chinese Office Action from corresponding Application No. 201010586269.4 dated Jan. 7, 2013.

* cited by examiner

METHOD AND APPARATUS FOR PROCESSING WORLD WIDE WEB PAGE

FIELD OF THE INVENTION

The present invention relates to Internet technology, and more particularly, to a method and apparatus for processing a World Wide Web (WWW) page.

BACKGROUND OF THE INVENTION

With the popularity of broadband Internet, contents displayed on WWW pages of the Internet are increasingly enriching. However, redundant information, such as advertising information, is also constantly increasing. When a user browses a WWW page by a terminal with a limited size, such as a mobile terminal, the redundant information will bring about a great deal of inconvenience to the user's browse.

SUMMARY OF THE INVENTION

In view of above, embodiments of the present invention provide a method for processing a WWW page and an apparatus for processing a WWW page, so as to effectively eliminate the redundant information.

The method for processing a WWW page provided by embodiments of the present invention includes:

determining at least one website to be optimized; generating a corresponding page template for each of WWW pages with different types in each website, and storing the corresponding page template;

constantly grabbing WWW pages from each website, matching each grabbed WWW page with a page template corresponding to the grabbed WWW page, filtering redundant Hyper Text Mark-up Language (HTML) data from the WWW page according to a matching result, and storing the filtered WWW page without the redundant HTML data;

after receiving a request, sent by a terminal, for accessing a WWW page, determining whether there is a stored filtered WWW page without the redundant HTML data corresponding to the WWW page requested by the terminal, when there is a stored WWW page without the redundant HTML data corresponding to the WWW page requested by the terminal, returning the filtered WWW page without the redundant HTML data to the terminal.

The apparatus for processing a WWW page provided by embodiments of the present invention includes:

a first processing unit configured to determine at least one website to be optimized; generate a corresponding page template for each of WWW pages with different types in each website, and store the corresponding page template; constantly grab WWW pages from each website, match each grabbed WWW page with a page template corresponding to the grabbed WWW page, filter redundant Hyper Text Mark-up Language, HTML, data from the WWW page according to a matching result, and store the filtered WWW page without the redundant HTML data;

a second processing unit configured to, after receiving a request sent by a terminal for accessing a WWW page, determine whether there is a filtered WWW page without the redundant HTML data corresponding to the WWW page requested by the terminal stored in the first processing unit, when there is a stored filtered WWW page without the redundant HTML data corresponding to the WWW page requested by the terminal, obtain the filtered WWW page without the redundant HTML data from the first processing unit, and return the filtered WWW page without the redundant HTML data to the terminal.

As can be seen, by adopting the technical solutions of the present invention, redundant Hypertext Markup Language (HTML) information, such as advertising information, may be filtered from a grabbed WWW page according to a page template. That is, redundant information is efficiently eliminated, thereby facilitating the user's browse. In addition, the technical solutions of the present invention can be implemented simply and conveniently.

BRIEF DESCRIPTION OF DRAWINGS

The exemplary embodiment of the present invention will be described in detail hereinafter with reference to accompanying drawings, so as to make above mentioned or other features and advantages of the present invention clearer to one skilled in the art. In the accompanying drawings.

DETAILED DESCRIPTION OF THE INVENTION

In view of above problem existed in the prior art, the present invention provides a new scheme for processing a WWW page.

In order to make objectives, technical solutions and advantages of the present invention clearer, the present invention will be described in detail hereinafter with reference to accompanying drawings.

Figure 1:
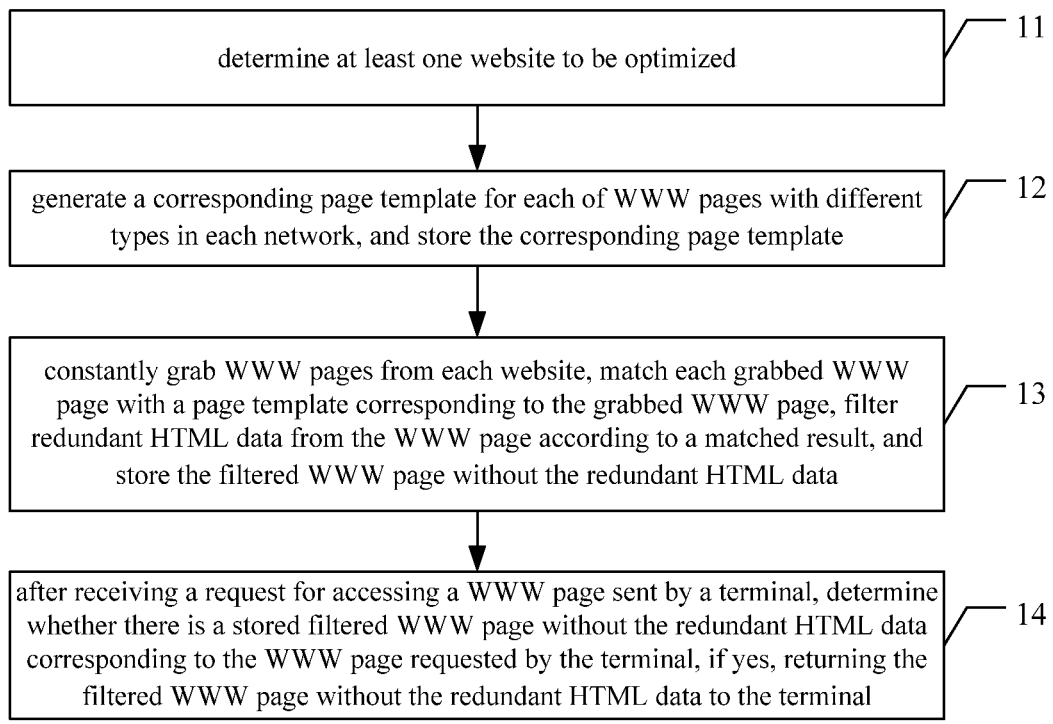
FIG. 1 is a flowchart illustrating a method for processing a WWW page according to an embodiment of the present invention.

FIG. 1 is a flowchart illustrating a method for processing a WWW page according to an embodiment of the present invention. As shown in FIG. 1, the method includes the following processes.

In block 11, a website to be optimized is determined.

In practical application, it is possible to determine websites to be optimized (of which WWW pages will be filtered according to the follow-up method) by a background administrator, compose a website link list with determined websites, and input the website link list to the background processing system.

Theoretically, the more websites the website link list includes, the better. However, taking into account factors, such as maintenance costs, the website link list may only include some websites commonly used.

In block 12, for each of WWW pages with different types in each website, a corresponding page template is respectively generated and stored.

In block 12, for each website X in the website link list, the following processes are performed respectively. According to a received instruction of the background administrator, for each of the various types of WWW pages in website X, a WWW page is obtained. Each obtained WWW page is respectively analyzed to construct a Document Object Model (DOM) tree. According to a received instruction of the background administrator, each DOM node unnecessary to be reserved in each DOM tree is deleted. Then each DOM tree in which each DOM node unnecessary to be reserved is deleted is respectively transformed into a WWW page, and the WWW page is stored as a page template. How to analyze the WWW page to construct the DOM tree and how to transform a DOM tree into a WWW page may be implemented with existing technologies.

In practical application, relevant plug-in may be developed and installed in a browser, such as a FireFox browser, of the background processing system. Subsequently, the background administrator may access different types of WWW pages in different websites via the FireFox browser with the plug-in. Specifically, for each type, such as news type or BBS type, of WWW pages in each website, it is possible to randomly select one WWW page to access, and select contents to be reserved and contents to be deleted in the accessed WWW page by a mouse. The plug-in is adapted to, according to operations of the background administrator, correspondingly implement the functions including analyzing the WWW page to construct a DOM tree, deleting a DOM node, and transforming a DOM tree into a WWW page.

After the process described in block 12, a series of page templates are obtained. For example, suppose the website link list includes three websites (here only gives an example for description, in practice, the number of websites included in the website link list may far exceed three), in which, the first website includes five different types of WWW pages, the second website includes six different types of WWW pages, the third website includes four different types of WWW pages, then it is possible to obtain total 5+6+4=15 page templates.

In block 13, WWW pages are constantly grabbed from each website. Each grabbed WWW page is respectively matched with a page template corresponding to the grabbed WWW page. According to a matching result, redundant Hyper Text Mark-up Language (HTML) data is filtered from the grabbed WWW page, and the grabbed WWW page without the redundant HTML data is stored.

The background processing system may constantly grab WWW pages from each website in the website link list. The grabbing operation may be performed in real time or may be performed once at each interval. Objects grabbed by the background processing system include all WWW pages in each website.

For each grabbed WWW page Y, the following processes are performed respectively. WWW page Y is analyzed to construct a DOM tree, namely DOM tree 1. Page template Y corresponding to WWW page Y is analyzed to construct a DOM tree, namely DOM tree 2. For each DOM node in DOM tree 1, whether there is a matching DOM node in DOM tree 2 is determined. If there is a matching DOM node in DOM tree 2, no operations will be performed on the DOM node in DOM tree 1; otherwise, the DOM node in DOM tree 1 will be deleted. DOM tree 1 in which each DOM node unnecessary to be reserved has been deleted is transformed into a WWW page, and the DOM tree 2 is transformed into page template Y. How to determine whether a DOM node has a matched node may be state-of-the-art technology. With this method, it is possible to filter out redundant HTML data, such as advertising information, from a WWW page.

Above-mentioned page template Y corresponding to WWW page Y refers to a page template of the same type as WWW page Y, and the page template and WWW page Y belong to the same website. In practical application, when each page template is stored, it is possible to simultaneously store the Uniform Resource Location (URL) of each page template. URL may reflect information, such as the website to which the page template belongs and the type of the page template. Thus, before each grabbed WWW page is matched with its corresponding page template, it is possible to determine the corresponding page template according to the URL of each grabbed WWW page.

In block 14, when a request sent by a terminal for accessing a WWW page is received, it is determined whether there is a stored WWW page with the redundant HTML data filtered out corresponding to the WWW page requested by the terminal. If there is a stored and filtered WWW page without the redundant HTML data corresponding to the WWW page requested by the terminal, the filtered WWW page without the redundant HTML data is returned to the terminal.

In block 14, when receiving a request for accessing a WWW page sent by a terminal, the background processing system firstly determines whether there is a WWW page with the redundant HTML data filtered out corresponding to the WWW page requested by the terminal stored in local, namely, determines whether the WWW page requested by the terminal has been grabbed and optimized. If there is a corresponding filtered WWW page without redundant HTML data, the corresponding filtered WWW page without the redundant HTML data is returned to the terminal, otherwise, the real-time transformation process of the WWW page is implemented according to existing technologies.

Figure 2:
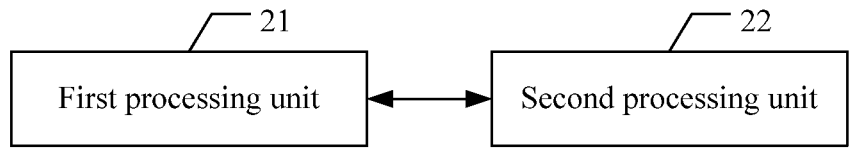
FIG. 2 is a schematic diagram illustrating a structure of an apparatus for processing a WWW page according to an embodiment of the present invention.

Based on above mentioned description, FIG. 2 is a schematic diagram illustrating a structure of an apparatus for processing a WWW page according to an embodiment of the present invention. As shown in FIG. 2, the apparatus includes a first processing unit 21 and a second processing unit 22.

The first processing unit 21 is configured to determine at least one website to be optimized. For each WWW page of different types in each website, the first processing unit respectively generates and stores a corresponding page template, constantly grabs WWW pages from each website, compares each grabbed WWW page with its corresponding page template respectively, filters redundant HTML data from the grabbed WWW page according to a compared result, and stores the filtered WWW page without redundant HTML data.

The second processing unit 22 is configured to, when receiving a request for accessing a WWW page sent by a terminal, determine whether there is a filtered WWW page corresponding to the WWW page requested by the terminal stored in the first processing unit 21. When there is a filtered WWW page corresponding to the WWW page requested by the terminal stored in the first processing unit 21, the second processing unit 22 obtains the filtered WWW page from the first processing unit 21, and returns the filtered WWW page to the terminal.

The second processing unit 22 is further configured to, when there is no filtered WWW page corresponding to the WWW page requested by the terminal stored in the first processing unit 21, implement the real-time transformation process for the WWW page.

The first processing unit 21 may further include (to simplify the drawings, the detailed structure of the first processing unit is not illustrated) a first processing sub-unit, a second processing sub-unit and a third processing sub-unit.

The first processing sub-unit is configured to receive at least one website to be optimized inputted by a background administrator.

The second processing sub-unit is configured to perform the following operations for each website X: according to a received instruction of the background administrator, obtain a WWW page from each type of the various types of WWW pages in website X; respectively analyze each obtained WWW page to construct a Document Object Model (DOM) tree; according to a received instruction of the background administrator, delete each DOM node unnecessary to be reserved from each DOM tree; transform each DOM tree that has DOM node deleted into a WWW page respectively, and store the WWW page as a page template.

The third processing unit is configured to constantly grab WWW pages from each website, and for each grabbed WWW page Y, to perform the following operations respectively: analyze WWW page Y to construct a DOM tree, and obtain DOM tree 1; analyze page template Y corresponding to WWW page Y to construct a DOM tree, and obtain DOM tree 2; for each DOM node in DOM tree 1, determine whether there is a matching DOM node in DOM tree 2; when there is a matching DOM node in DOM tree 2, perform no operations on the DOM node in DOM tree 1; otherwise, delete the DOM node in DOM tree 1; transform DOM tree 1 in which each DOM node unnecessary to be reserved has been deleted into a WWW page; and transform DOM tree 2 into page template Y.

For specific process of the apparatus embodiment shown in FIG. 2, corresponding description in the method embodiment shown in FIG. 1 may be referred, thus no further description will be provided here. In addition, the terminal mentioned in the embodiments shown in FIG. 1 and FIG. 2 is generally a mobile terminal.

The foregoing description is only preferred embodiments of the present invention and is not used for limiting the protection scope thereof. Any modification, equivalent substitution, or improvement made without departing from the principle of the present invention is within the protection scope of the present invention.

The invention claimed is:

1. A method for processing a World Wide Web (WWW) page, the method comprises:
   determining at least one website to be optimized;
   generating a corresponding page template for each of WWW pages with different types in each website, and storing the corresponding page template;
   constantly grabbing WWW pages from each website, matching each grabbed WWW page with a page template corresponding to the grabbed WWW page, filtering redundant Hyper Text Mark-up Language (HTML) data from the WWW page according to a matching result, and storing the filtered WWW page without the redundant HTML data;
   after receiving a request, sent by a terminal, for accessing a WWW page, determining whether there is a stored filtered WWW page without the redundant HTML data corresponding to the WWW page requested by the terminal; and
   when there is a stored filtered WWW page without the redundant HTML data corresponding to the WWW page requested by the terminal, returning the filtered WWW page without the redundant HTML data to the terminal;
   wherein generating a corresponding page template for each of WWW pages with different types in each website, and storing the corresponding page template comprises performing the following operations for each respective website X;
      obtaining a WWW page from each of the various types of WWW pages in the website X according to a received instruction of a background administrator;
      respectively analyzing each obtained WWW page to construct a Document Object Model (DOM) tree;
      deleting each DOM node unnecessary to be reserved from each DOM tree according to a received instruction of a background administrator;
      respectively transforming each DOM tree in which each DOM node unnecessary to be reserved is deleted into a WWW page; and
      storing the WWW page as a page template.

2. The method according to claim 1, the method further comprises:
   storing a Uniform Resource Location (URL) of each page template; and
   before matching each grabbed WWW page with a page template corresponding to the grabbed WWW page, further comprising: determining the page template corresponding to the grabbed WWW page according to the URL of the grabbed WWW page.

3. The method according to claim 1, wherein the terminal is a mobile terminal.

4. The method according to claim 1, the method further comprises:
   when there is no stored filtered WWW page without the redundant HTML data corresponding to the WWW page requested by the terminal, implementing a real-time transformation process for the WWW page requested by the terminal.

5. A method for processing a World Wide Web (WWW) page, the method comprises:
   determining at least one website to be optimized;
   generating a corresponding page template for each of WWW pages with different types in each website, and storing the corresponding page template;
   constantly grabbing WWW pages from each website, matching each grabbed WWW page with a page template corresponding to the grabbed WWW page, filtering redundant Hyper Text Mark-up Language (HTML) data from the WWW page according to a matching result, and storing the filtered WWW page without the redundant HTML data;
   after receiving a request, sent by a terminal, for accessing a WWW page, determining whether there is a stored filtered WWW page without the redundant HTML data corresponding to the WWW page requested by the terminal; and
   when there is a stored filtered WWW page without the redundant HTML data corresponding to the WWW page requested by the terminal, returning the filtered WWW page without the redundant HTML data to the terminal;
   wherein matching each grabbed WWW page with a page template corresponding to the grabbed WWW page, filtering redundant HTML data from the WWW page according to a matching result comprises, for each grabbed WWW page Y,
      analyzing the WWW page Y to construct a DOM tree, and obtaining a first DOM tree,
      analyzing page template Y corresponding to the WWW page Y to construct a DOM tree, and obtaining a second DOM tree,
      for each DOM node in the first DOM tree, determining whether there is a matched DOM node in the second DOM tree,
      when there is a matched DOM node in the second DOM tree, performing no operations on the DOM node in the first DOM tree, otherwise, deleting the DOM node from the first DOM tree,
      transforming the first DOM tree in which each DOM node unnecessary to be reserved is deleted into a WWW page, and
      transforming the second DOM tree into page template Y.

6. The method according to claim 5, the method further comprises:

when there is no stored filtered WWW page without the redundant HTML data corresponding to the WWW page requested by the terminal, implementing a real-time transformation process for the WWW page requested by the terminal.

7. The method according to claim 5, the method further comprises:
storing a Uniform Resource Location (URL) of each page template; and
before matching each grabbed WWW page with a page template corresponding to the grabbed WWW page, determining the page template corresponding to the grabbed WWW page according to the URL of the grabbed WWW page.

8. The method according to claim 5, wherein the terminal is a mobile terminal.

9. An apparatus for processing a World Wide Web (WWW) page, the apparatus comprises: a processor coupled to a memory storing instruction units for execution by the processor;
the instruction units comprise,
a first processing unit to determine at least one website to be optimized, generate a corresponding page template for each of WWW pages with different types in each website, store the corresponding page template, constantly grab WWW pages from each website, match each grabbed WWW page with a page template corresponding to the grabbed WWW page, filter redundant Hyper Text Mark-up Language (HTML) data from the WWW page according to a matching result, and store the filtered WWW page without the redundant HTML data, and
a second processing unit to, after receiving a request sent by a terminal for accessing a WWW page, determine whether there is a filtered WWW page without the redundant HTML data corresponding to the WWW page requested by the terminal stored in the first processing unit, when there is a stored filtered WWW page without the redundant HTML data corresponding to the WWW page requested by the terminal, obtain the filtered WWW page without the redundant HTML data from the first processing unit, and return the filtered WWW page without the redundant HTML data to the terminal,
wherein the first processing unit comprises, a first processing sub-unit, to receive at least one website to be optimized inputted by a background administrator,
a second processing sub-unit, to perform the following operations for each website X,
according to a received instruction of the background administrator, obtain one WWW page from each of the various types of WWW pages in the website X,
respectively analyze each obtained WWW page to construct a DOM tree,
according to a received instruction of the background administrator, delete each DOM node unnecessary to be reserved from each DOM tree,
transform each DOM tree in which each DOM node unnecessary to be reserved is deleted into a WWW page respectively, and
store the WWW page as a page template; and
a third processing unit, to constantly grab WWW pages from each website, for each grabbed WWW page Y, and perform the following processes respectively,
analyze the WWW page Y to construct a DOM tree, and obtain a first DOM tree,
analyze the page template Y corresponding to the WWW page Y to construct a DOM tree, and obtain a second DOM tree,
for each DOM node in the first DOM tree, determine whether there is a matched DOM node in the second DOM tree, when there is a matched DOM node in the second DOM tree, perform no operations on the DOM node in the first DOM tree, otherwise, delete the DOM node in the first DOM tree,
transform the first DOM tree in which each DOM node unnecessary to be reserved is deleted into a WWW page, and
transform the second DOM tree into page template Y.

10. The apparatus according to claim 9, wherein the terminal is a mobile terminal.

11. The apparatus according to claim 9, wherein the second processing unit is further to, when there is no filtered WWW page without the redundant HTML data corresponding to the WWW page requested by the terminal stored in the first processing unit, implement a real-time transformation process for the WWW page requested by the terminal.

* * * * *